(12) United States Patent
Smith et al.

(10) Patent No.: US 11,904,439 B2
(45) Date of Patent: Feb. 20, 2024

(54) APPARATUS AND METHODS FOR CONNECTOR TORQUE SLEEVE

(71) Applicant: CABLE TELEVISION LABORATORIES, INC., Louisville, CO (US)

(72) Inventors: Luther E. Smith, Fort Lupton, CO (US); Aaron Quinto, Erie, CO (US); Derek Matthews, Denver, CO (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 28 days.

(21) Appl. No.: 17/353,473

(22) Filed: Jun. 21, 2021

(65) Prior Publication Data

US 2021/0308845 A1 Oct. 7, 2021

Related U.S. Application Data

(63) Continuation of application No. 16/257,040, filed on Jan. 24, 2019, now Pat. No. 11,040,437.

(60) Provisional application No. 62/672,374, filed on May 16, 2018, provisional application No. 62/621,428, filed on Jan. 24, 2018.

(51) Int. Cl.
| | | |
|---|---|---|
| *B25B 23/142* | (2006.01) | |
| *H01R 43/26* | (2006.01) | |
| *B25B 13/06* | (2006.01) | |
| *F16B 1/00* | (2006.01) | |
| *H01R 13/622* | (2006.01) | |
| *H01R 24/38* | (2011.01) | |
| *H01R 24/40* | (2011.01) | |

(52) U.S. Cl.
CPC .......... *B25B 23/1427* (2013.01); *B25B 13/06* (2013.01); *F16B 1/00* (2013.01); *H01R 13/622* (2013.01); *H01R 43/26* (2013.01); *H01R 24/38* (2013.01); *H01R 24/40* (2013.01)

(58) Field of Classification Search
CPC ...... H01R 13/622; H01R 43/26; H01R 24/38; H01R 24/40; B25B 13/06; B25B 13/46
See application file for complete search history.

(56) References Cited

U.S. PATENT DOCUMENTS

| | | | |
|---|---|---|---|
| 8,065,940 B2 | 11/2011 | Wilson et al. | |
| 8,235,741 B2 * | 8/2012 | Schulze | H01R 13/622 439/339 |
| 8,490,525 B2 | 7/2013 | Wilson et al. | |
| 10,756,483 B2 | 8/2020 | Montena et al. | |
| 11,283,217 B2 * | 3/2022 | Montena | H01R 9/05 |

* cited by examiner

*Primary Examiner* — David B. Thomas
(74) *Attorney, Agent, or Firm* — Polsinelli PC

(57) ABSTRACT

A torque sleeve for a connector includes a slip ring, a torque ring, a torque spring, and an outer shell. The slip ring includes at least one axial movement inhibiting structure, and a plurality of first teeth having a first sawtooth pattern disposed in an axial direction of the torque sleeve. The torque ring includes at least one radial movement inhibiting structure, and a plurality of second teeth having a second sawtooth pattern disposed in an axial direction of the torque sleeve facing the plurality of first teeth. The torque spring is configured to apply a spring force against the torque ring to encourage movement of the torque ring toward the slip ring. The outer shell is configured to house the slip ring, the torque ring, and the torque spring within the torque sleeve.

15 Claims, 6 Drawing Sheets

APPARATUS AND METHODS FOR CONNECTOR TORQUE SLEEVE

CROSS REFERENCE TO RELATED APPLICATIONS

This application is a continuation of U.S. patent application Ser. No. 16/257,040, filed on Jan. 24, 2019, now issued as U.S. Pat. No. 11,040,437, which claims the benefit of and priority to U.S. Provisional Patent Application Ser. No. 62/621,428, filed Jan. 24, 2018, and to U.S. Provisional Patent Application Ser. No. 62/672,374, filed May 16, 2018. Each of these applications is incorporated herein by reference in their entireties.

BACKGROUND

The field of the disclosure relates generally to connector devices, and more particularly, to external torque sleeves for threaded connectors.

Many conventional structures employ fasteners such as nuts, bolts, screws, etc. (hereinafter, "connector") that surround or are fixed to a portion of a first structure, and enable the attachment of the first structure to a complementary attachment portion of a second structure by the application of torque to connector to fixedly engage the second structure. For example, coaxial cables typically include, at an end portion of the cable, a conventional threaded connector known as an F-connector (also referred to as "F-type connector"). The F-connector is conventionally utilized on radio frequency (RF) coaxial cables to fixedly connect the cable to a threaded receiving post, or similar engagement connection, on a customer premises equipment (CPE) device, such as a cable junction box, modem, television, or other cable-receiving devices. The conventional F-connectors generally include a threaded connection sleeve surrounded by an external hexagonal nut of a standardized size, which may be screwed onto a similarly-threaded post by human fingers for most indoor applications.

However, the standard size of conventional F-connectors makes it often difficult for human fingers to apply sufficient torque to screw/unscrew the F-connector onto the relevant mating structure. This difficulty is often compounded by the attachment of a long cable to the F-connector, which prevents placement of human fingers over the connector to firmly screw it around the complementary mating threads. Additionally, F-connectors that initially might be easily attached easily by hand, later might later be difficult to detach after a significant period of time. Furthermore, even where the average consumer/end user is able to connect undo attach the F-connector easily by hand, the consumer cannot easily determine the proper amount of torque to apply to the attachment, thereby risking damage to the equipment/device from over-torquing, or the ingress and egress of RF signals onto the RF cable from under-torquing.

In contrast, outdoor F-connector attachments are typically subject to more extreme environmental conditions, such as heat and cold that may cause the metal structure of the F-connector to more significantly expand and contract. Outdoor connections are also at risk from precipitation seeping into the connection, which may also result in undesirable RF signal ingress/egress. It is therefore important to be easily able to apply sufficient torque to the F-connector attachment in outdoor applications without damaging the attachment. However, it is desirable that technicians are more easily able to install (e.g., by hand) the F-connectors in outdoor applications without requiring special tools, such as a wrench.

One conventional solution to the over-torquing/under-torquing problem is disclosed in U.S. Pat. No. 8,490,525, which describes a torque application device for applying a predetermined maximum torque to F-connector. This conventional torque application device is placed around the hex nut of the F-connector, and includes a collar, a grip, and a slip mechanism, which collectively allow a user to apply sufficient torque to the F-connector by hand without exceeding a maximum torque amount. The slip mechanism includes opposing triangular tooth structures that slip away from one another after the maximum torque amount has been reached, at which point an audible or visual indicator alerts the user that the torque amount has been applied.

One difficulty with this conventional torque application device though, is that the slip mechanism allows the triangular teeth to slip in both directions. That is, once the predetermined amount of torque has been reached, which prevents over-torquing, the triangular tooth patterned of that same slip mechanism prevents the user from applying sufficient torque in the opposite direction (i.e., from the friction from the fixed attachment) to unscrew the F-connector when desired. Accordingly, it is desirable to provide a convenient torque application device for an F-connector which allows a user to easily attach the connector by hand without over-torquing, but which also allows the user to easily detach the connector when desired.

BRIEF SUMMARY

In an embodiment, a torque sleeve for a connector includes a slip ring, a torque ring, a torque spring, and an outer shell. The slip ring includes at least one axial movement inhibiting structure, and a plurality of first teeth having a first sawtooth pattern disposed in an axial direction of the torque sleeve. The torque ring includes at least one radial movement inhibiting structure, and a plurality of second teeth having a second sawtooth pattern disposed in an axial direction of the torque sleeve facing the plurality of first teeth. The torque spring is configured to apply a spring force against the torque ring to encourage movement of the torque ring toward the slip ring. The outer shell is configured to house the slip ring, the torque ring, and the torque spring within the torque sleeve.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figures 1A, 1B:
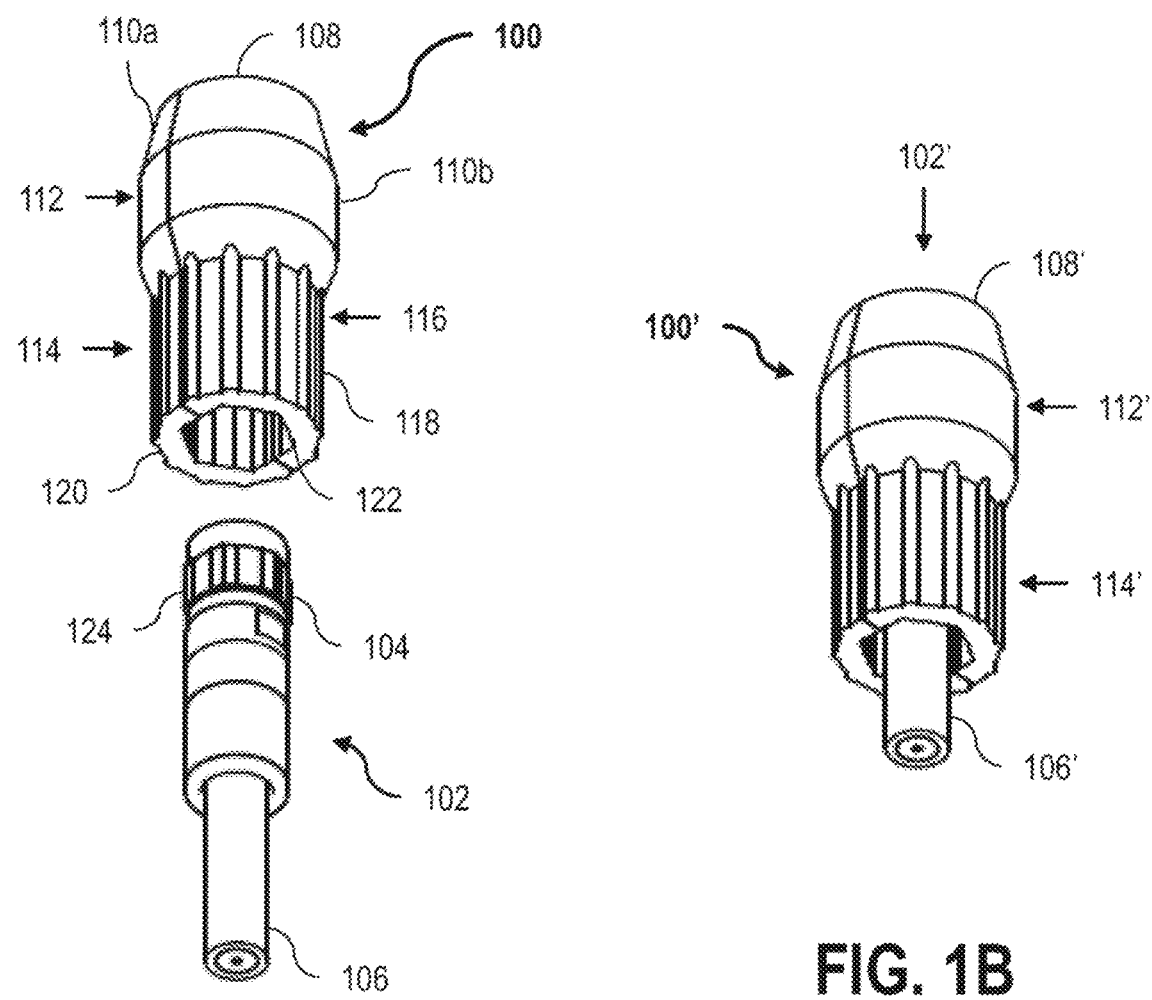
FIG. 1A is an exploded perspective view of an exemplary torque sleeve and an F-connector, in accordance with an embodiment.
FIG. 1B is a perspective view of an exemplary combination of the torque sleeve and F-connector depicted in FIG. 1A.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In an exemplary embodiment, an advanced torque sleeve enables a fastener, such as an F-connector, to be easily screwed onto a mating fitting that is threaded to fixedly connect with the F-connector. The advanced torque sleeve easily allows the F-connector to be screwed onto the attachment by a single hand up to a maximum desired torque, and easily detached in reverse, when desired. In the exemplary embodiment, the advanced torque sleeve is configured to enable F-connector slide into the torque sleeve in a guided fashion such that an interior dimension generally corresponds to an outer dimension of the F-connector to secure the F-connector within the torque sleeve to allow rotation of the hex nut by rotation of the torque sleeve, but without rotating the attached cable that protrudes out the opposite end of the torque sleeve. The front portion of the F-connector will be secured within the torque sleeve such that the front portion is substantially flush with a terminal end of the torque sleeve.

In at least one embodiment, a slide-on torque sleeve for an F-connector slide is configured to slide onto and over a terminal end of a cable F-connector. By this configuration, the fitted torque sleeve slides onto cable F-connectors to enable a consumer to properly torque the connector to the respective CPE device. The consumer would then be enabled to much more easily remove/detach and reinstall/reattach the cable to the CPE device(s) while still maintaining the proper torque upon the F-connector. Maintenance of the proper torque well will reduce the risk of outside interference signals from getting onto the cable plant.

The present torque sleeve is advantageous over conventional designs in that the embodiments described herein provides a unidirectional tooth mechanism that allows functional torque slippage in only one direction, while providing full torque in the opposite direction with no slippage. This structural configuration represents a significant improvement over conventional torque application devices using spring clutches or symmetrical (e.g., triangular) teeth, which are useful to prevent over-torquing, but are problematic when detaching an F-connector attachment. In contrast, the present embodiments are capable of allowing slippage when a predetermined torque amount is reached in an attachment of direction, but locking an inner ring of the torque sleeve when loosening/detaching the attachment to easily remove the F-connector from the CPE when desired. Conventional devices are not capable of locking in one direction; the torque-slippage functionality exists in both the winding and unwinding directions.

The present embodiments thus further advantageous over conventional devices with respect to the ability to address instances of over-torquing an F-connector onto a CPE. The conventional apparatuses would be unable to overcome the friction of the over-torqued connection, and the opposing teeth or clutch of the conventional designs would slip against each other when an effort is made to detach the connection. In such cases, the conventional torque application device would have to be removed from the cable/F-connector, and the connection unscrewed using a wrench or similar tool. The innovative design of the present embodiments though, do not sacrifice any of the advantageous features of the conventional designs, and particularly with respect to the ability to attach to the F-connectors before or after the F-connector is fixed to the cable, or the ability to be integrated with an F-connector as a unitary device prior to attachment to a cable. Different from the conventional devices, however, in some embodiments, the present torque sleeve may be employed onto an existing attachment of an F-connector to a CPE, that is, after the attachment has already been made (e.g., a snap-fit around the attached cable and/or F-connector).

The present torque sleeve therefore advantageously enables the end user or technician to properly apply the correct torque to the cable F-connector, while eliminating the risk of over-torquing connector, which may damage the CPE, or under-torquing the connector, which may allow undesirable ingress and egress of RF signals onto the RF cable. In exemplary embodiments, the present torque sleeve is installed on the F-connector by slipping over the F-connector until engaged onto and securely gripping the connector. Once engaged, the torque sleeve enables easy installation of the F-connector onto the CPE, due to the torque sleeve having a larger diameter than the standard-size F-connector, which allows the user to easily tighten (or loosen) the connector without the use of a wrench or other similar special tool.

FIG. 1A is an exploded perspective view of an exemplary torque sleeve 100 and an F-connector 102. More particularly, the illustration depicted in FIG. 1A represents a case of torque sleeve 100 prior to implementation onto F-connector 102. In this example, F-connector 102 includes a rotatable hex nut 104, and F-connector 102 has already been fixedly attached onto a coaxial cable 106. Torque sleeve 100 includes an outer shell 108, which may be a unitary structure formed from a rigid, durable material (e.g., plastic, metal, rubber, combinations thereof, etc.), or may be formed as an assembly of several shell subcomponents fixedly joined together, such as by adhesive, welding, snap-fit, etc. In this example, outer shell 108 is illustrated to be formed from two substantially symmetrical shell halves 110a and 110b, and is generally cylindrical. Nevertheless, in other embodiments, outer shell 108 may be non-cylindrical for all or some of its length.

In an exemplary embodiment, outer shell 108 includes a forward portion 112 and a rearward portion 114. For the purposes of this discussion, "forward" refers to the relative disposition of torque sleeve 100 with respect to the CPE (not shown) to which attachment is desired, and "rearward" refers to the direction of cable 106 leading away from the CPE. In this example, a gripping structure 116 is provided on rearward portion 114, and includes a plurality of protruding ridges 118 distributed about an outer circumference 120 of rearward portion 114. In some embodiments, gripping structure 116 may be alternatively, or additionally, disposed about forward portion 112. In this example, gripping structure is located on rearward portion 114 to decrease the outer diameter of forward portion 112, while providing the user the ability to grip outer shell 108 at a location farther away from the point of attachment (not shown) at the CPE, where space may be more limited, and it may be more difficult to place human fingers easily around forward portion 112 when attaching to the CPE.

In an exemplary embodiment, rearward portion 114 of outer sleeve 108 further includes a rearward inner diameter 122 configured to be slightly larger than an outer diameter 124 of F-connector 102. That is, rearward inner diameter 122 of torque sleeve 100, at rearward portion 114, is sized to be larger than the largest outer dimension of F-connector 102, which will typically be from hex nut 104. In at least one embodiment, rearward inner diameter 122 of rearward portion 114 is not circularly cylindrical, but instead hexagonal along its length, such that the internal dimension of rearward inner diameter 122 substantially corresponds to the external shape of hex nut 104, but slightly larger (e.g., similar to a socket wrench fitting), to securely surround hex nut 104 within torque sleeve 100 (as shown in FIG. 1B), but prevent substantial rotational wiggle of hex nut 104 with respect to torque sleeve 100.

FIG. 1B is a perspective view of an exemplary combination of torque sleeve 100 and F-connector 102, FIG. 1A. Specifically, the illustration depicted in FIG. 1B represents an operational implementation case of torque sleeve 100 onto F-connector 102, hereinafter designated torque sleeve 100' (and similarly for the respective components thereof), to distinguish this operational embodiment from the separated components depicted in FIG. 1A for illustrative purposes. Structurally, torque sleeves 100 and 100' are identical.

As depicted in FIG. 1B, when fully engaged on and around F-connector 102', torque sleeve 100' may completely envelop F-connector 102' within outer sleeve 108', and only cable 106' is seen to protrude rearwardly from torque sleeve 100'. In some cases though, F-connector 102' may have a sufficient length such that a portion thereof may protrude rearwardly from rearward portion 114'. As can be seen from the embodiment depicted in FIG. 1B, torque sleeve 100' may be removably or fixedly attached to F-connector 102'. In at least one embodiment, torque sleeve 100' may be integrally formed with, or fixed onto F-connector 102' prior to attachment of cable 106' to F-connector 102'.

Figures 2A, 2B:
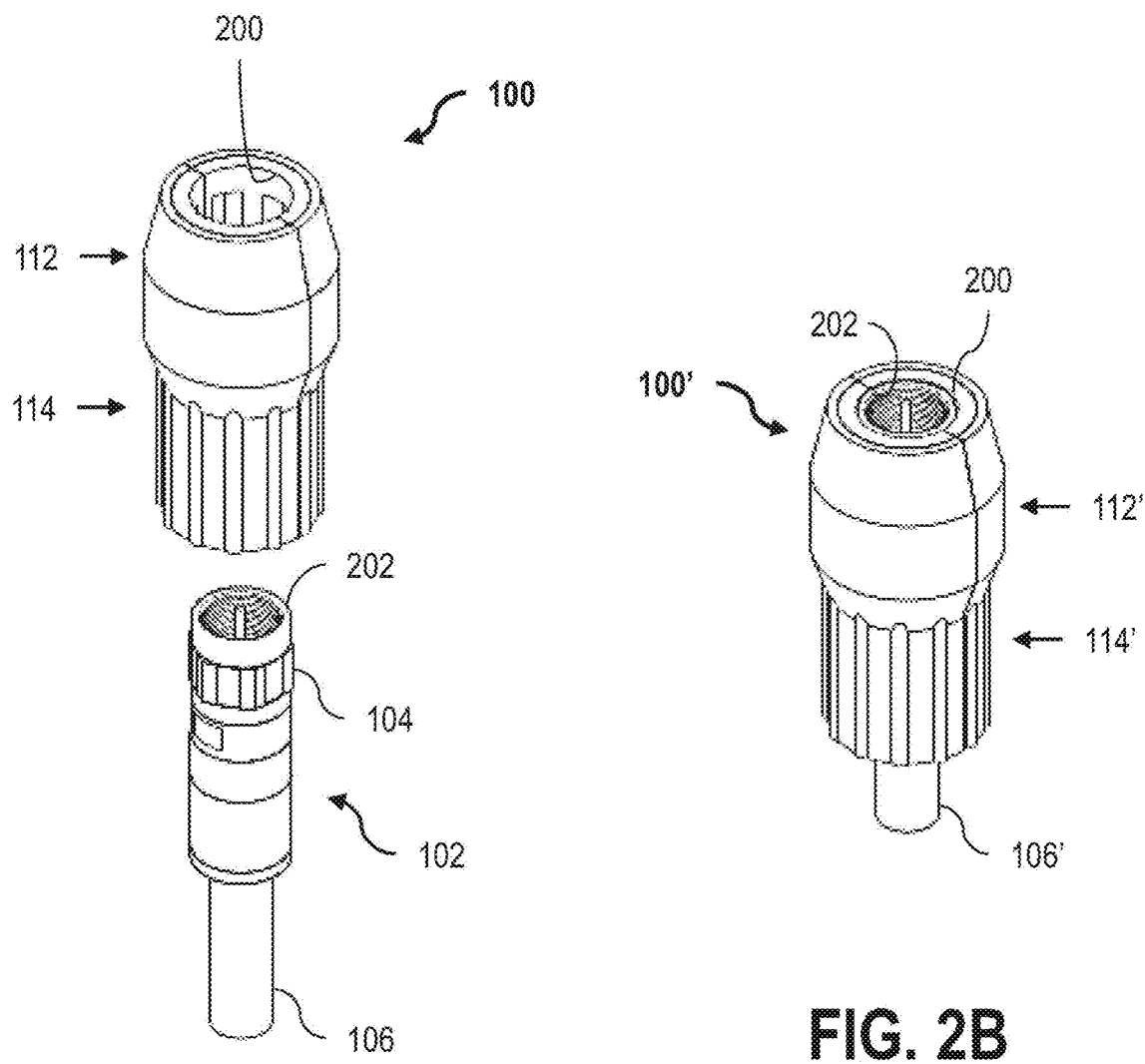
FIG. 2A is an alternative exploded perspective view of the torque sleeve and F-connector depicted in FIG. 1A.
FIG. 2B is perspective view of an exemplary combination of the torque sleeve and F-connector depicted in FIG. 2A.

FIG. 2A is an alternative exploded perspective view of torque sleeve 100 and F-connector 102, FIG. 1A. The embodiment depicted in FIG. 2A is substantially similar to the embodiment depicted in FIG. 1A, except that the embodiment of FIG. 2A is shown looking toward the rearward perspective, whereas the embodiment of FIG. 1A is shown looking toward the forward perspective. Looking toward the rearward perspective seen in FIG. 2A, forward portion 112 is shown to include a forward inner diameter 200 at the forward end of torque sleeve 100. In the exemplary embodiment, forward inner diameter 200 corresponds to an outer shape of a collar portion 202 of F-connector 102 that extends forward of hex nut 104, except that forward inner diameter 200 will be slightly larger than collar portion 202.

In the example depicted in FIG. 2A, forward inner diameter 200 and collar portion 202 are about the circular. However, in some F-connector devices, the rotatable hex nut thereof extends all of the way forward. That is, some F-connectors do not include a forward collar beyond the hex nut. In such cases, forward inner diameter 200 of torque sleeve 100 may have a hexagonal shape to correspond to the relevant shape of hex nut 104, and similar to the internal shape of rearward internal diameter 122, FIG. 1A. In at least one embodiment, forward internal diameter 200 and rearward internal diameter 122 have the same internal dimension, which may be continuous throughout the internal length of torque sleeve 100.

FIG. 2B is perspective view of an exemplary combination of torque sleeve 100 and F-connector 102, FIG. 2A. Specifically, the illustration depicted in FIG. 2B represents an operational implementation case of torque sleeve 100' onto F-connector 102', similar to the operational embodiment depicted in FIG. 1A, but seen looking toward the rearward perspective.

As depicted in FIG. 2B, in an exemplary embodiment, when fully engaged on and around F-connector 102', the forwardmost portion of forward inner diameter 200' of torque sleeve 100' is substantially flush with the forwardmost portion of collar portion 202' F-connector 102'. In some embodiments, collar portion 202' may protrude more forwardly than the forwardmost portion of torque sleeve 100' when fully engaged, such as in the case of narrow or hard-to-reach threaded posts of a CPE, junction box, splitter, etc.

Figure 3:
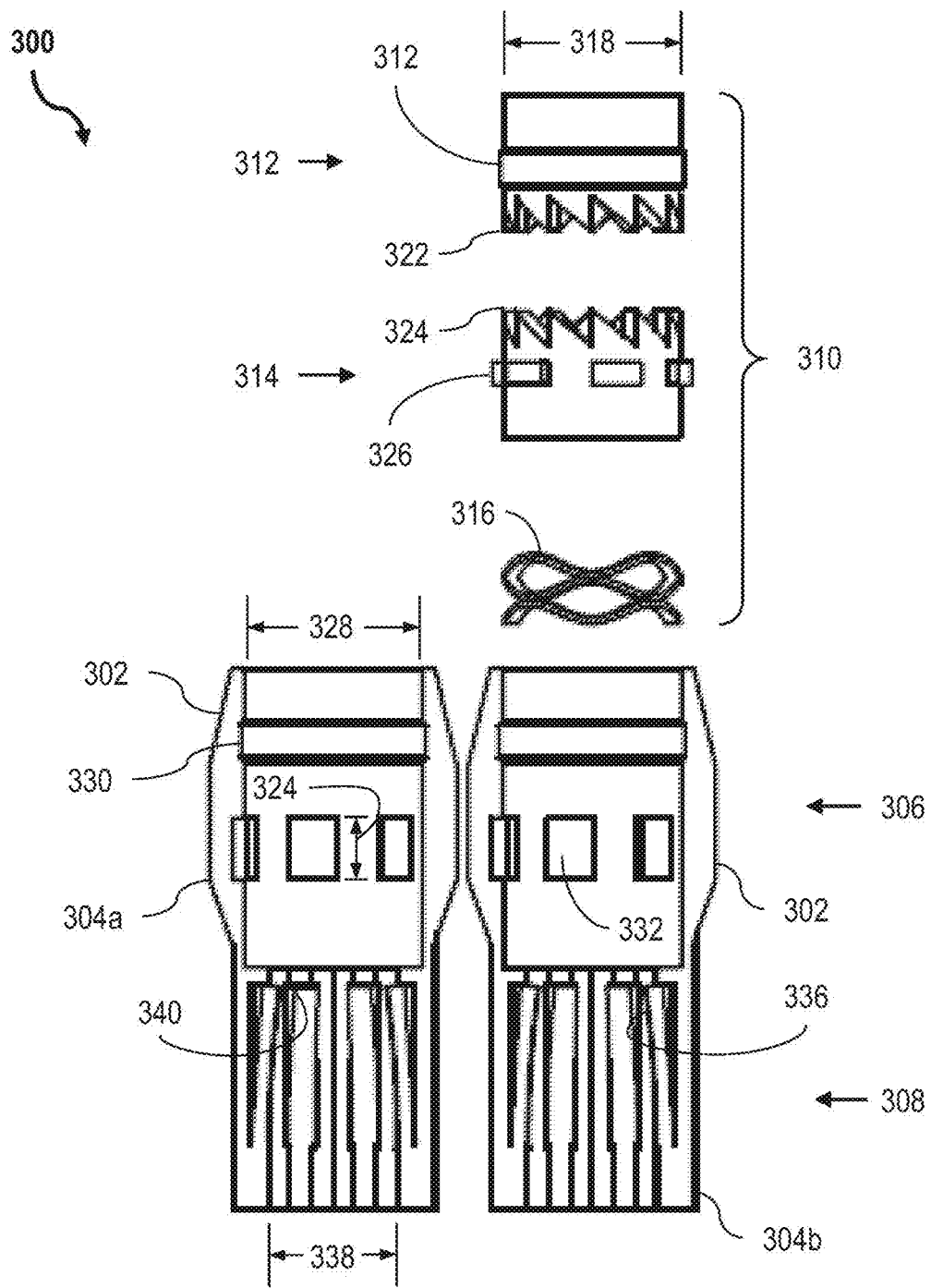
FIG. 3 is a disassembled side view of an exemplary torque sleeve, in accordance with an embodiment.

FIG. 3 is a disassembled side view of an exemplary torque sleeve 300. Torque sleeve 300 is similar to torque sleeve 100, FIG. 1A, in several structural respects, and similarly includes a generally cylindrical outer shell 302 having two substantially symmetrical shell halves 304a and 304b, a forward portion 306, and a rearward portion 308. Torque sleeve 300 further includes an internal torque subassembly 310. Internal torque subassembly 310 includes a slip ring 312, a torque ring 314, and a torque spring 316.

In an exemplary embodiment, slip ring 312 is generally cylindrical, and includes an outer ring circumference 318, an outer disc portion 320 that is slightly larger than outer ring circumference 318, and a plurality of slip teeth 322 arranged in a substantially sawtooth pattern facing torque ring 314. In a similar manner, torque ring 314 includes a plurality of torque teeth 324 also arranged in a substantially sawtooth pattern facing slip ring 312, and configured to matingly engage with slip teeth 322 to form a substantially continuous body about outer ring circumference 318 when so engaged. In the exemplary embodiment, torque ring 314 further includes a plurality of ring protrusions 326 extending radially from torque ring 314, and past outer ring circumference 318.

In a complementary fashion, outer shell 302 includes an inner shell circumference 328 sized to be slightly larger than outer ring circumference 318 of slip ring 312, such that slip ring 312 may freely rotate about a longitudinal axis (not shown) within inner shell circumference 328. Inner shell circumference 328 includes a shell groove 330 sized to receive outer disc portion 320 when torque sleeve 300 is fully assembled. In an exemplary embodiment, shell groove 330 is configured to allow free radial rotation of outer disc portion 320 about the longitudinal axis, but prevent axial movement of slip ring 312 in the forward or rearward directions.

Inner shell circumference 328 further includes a plurality of shell slots 332 disposed evenly about inner shell circumference 328. In the exemplary embodiment, the number of shell slots 332 corresponds to the number of ring protrusions 326 disposed about torque ring 314, and each of the respective ring protrusions 326 is sized to be engagingly received by at least one corresponding shell slot 332. In an embodiment, shell slots 332 are sized to prevent radial movement of ring protrusions 326 about the longitudinal axis. In the exemplary embodiment, shell slots 332 further include a slot axial length 334 that is sized to allow limited axial movement of ring protrusions 326 in the forward and rearward directions. In at least one embodiment, slot axial length 334 is slightly larger than the combination of a size of a ring protrusion 326 and a compression distance of torque spring 316 (described further below).

In some embodiments, rearward portion 308 of torque sleeve 300 further includes a plurality of internal tension prongs 336 disposed evenly about inner shell circumference 328. Internal tension prongs 336 are configured to be substantially immovable toward a rearmost portion of outer shell 302, where internal tension prongs 336 do not inwardly extend farther than a rearward inner diameter 338 of rearward portion 308. Toward forward portion 306 though, internal tension prongs 336 are configured to be pliable, and provide tension force against an F-connector and/or cable inserted within torque sleeve 300 (described further below with respect to FIG. 5B) at respective prong contact points 340 of each internal tension prong 336.

Figures 4A, 4B:
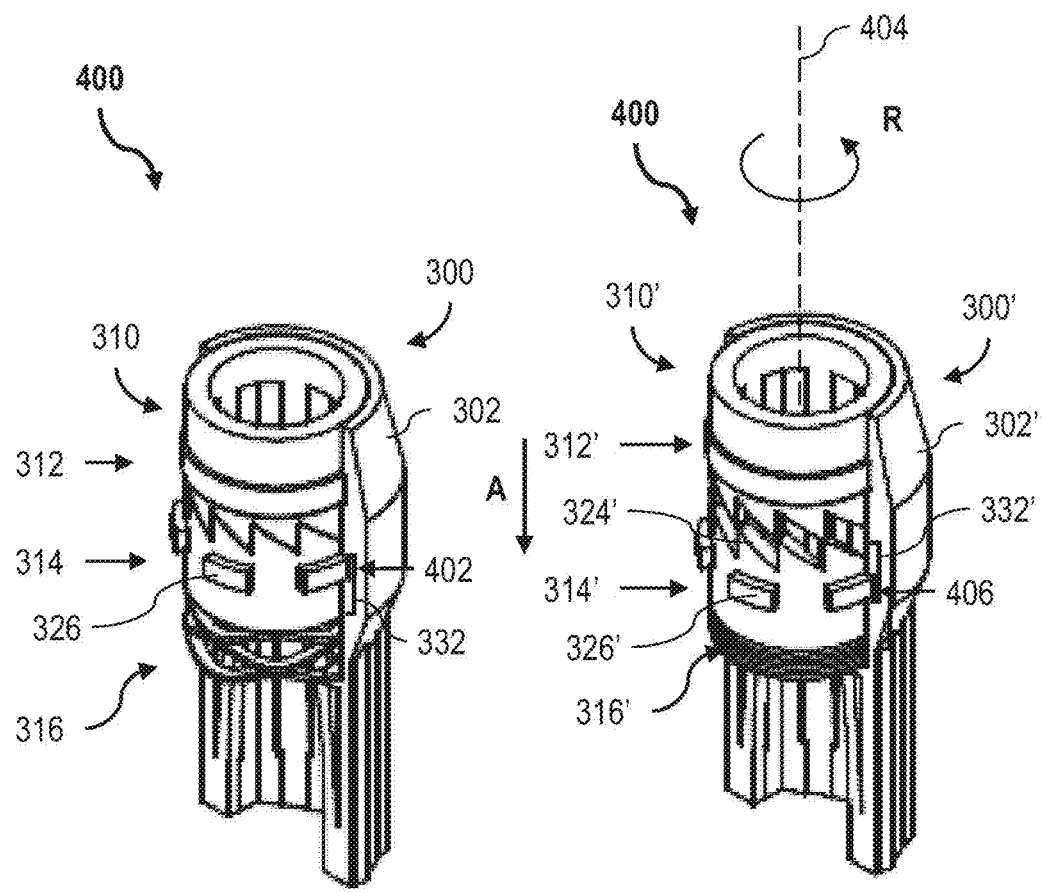
FIG. 4A is a partial cutaway perspective view of an exemplary internal structure of the torque sleeve depicted in FIG. 3, in accordance with an embodiment.
FIG. 4B depicts an operational structural configuration of the internal structure depicted in FIG. 4A.

FIG. 4A is a partial cutaway perspective view of an exemplary internal structure 400 of torque sleeve 300, FIG. 3. In the exemplary embodiment, internal structure 400 includes internal torque subassembly 310. The embodiment depicted in FIG. 4A represents a case of torque sleeve 300 at operational rest. That is no rotational force is applied thereto. In the rest position, torque spring 316 is to press torque ring 314 against slip ring 312 such that the respective teeth thereof matingly engage with one another, and such that ring protrusions 326 are at a forwardmost position 402 along slot axial length 334 of respective shell slots 332.

FIG. 4B depicts an operational structural configuration of internal structure 400, FIG. 4A. Specifically, the embodiment depicted in FIG. 4B illustrates relative movement of individual elements of torque sleeve 300' and internal structure 400' in relation to one another upon application of a rotational torque in radial direction R about a central axis 404 that is located along the virtual central length of torque sleeve 300'.

In exemplary operation, application of a rotational torque to outer shell 302' of torque sleeve 300', in radial direction R, will cause similar rotation of torque ring 314' in radial direction R from the radial force of shell slots 332' applied radially against ring protrusions 326'. Prior to reaching a predetermined torque value, the angled portions of torque teeth 324' push against opposing angled portions of slip teeth 322' to effectively rotate slip ring 312' together with the rotation of torque ring 314'. Continued application of rotational torque to torque sleeve 300' after the predetermined torque value has been reached or exceeded, however, will cause the respective teeth 322', 324' to push away from each other in the axial direction A. Because axial movement of slip ring 312' is prevented, excessive torque will cause torque spring 316' to compress, and torque ring 314' to push rearwardly away from slip ring 312' in the axial direction A until the peaks of the respective teeth meet one another.

In the fully extended rotational position illustrated in FIG. 4B, ring protrusions 326' can be seen to be disposed at a rearwardmost position 406 along slot axial length 334' of respective shell slots 332'. The spring force of compressed torque spring 316' will then function to push torque ring 314' in the forward axial direction A to fully reengage with slip ring 312'. Continued rotational torque of torque spring in this manner may make an audible indication (e.g., "clicking" sound) and that the desired amount of torque has been applied to attach the respective connector. In the opposite rotational direction, however, the respective vertical portions of opposing teeth 322', 324' prevent any slippage between rings 312' and 314', thereby allowing the end user to easily detach the respective connector from a CPE threading even after the desired torque amount has been reached. More particularly, the innovative sawtooth pattern of the respective rings only allows for unidirectional slippage to prevent over-torquing, thereby solving the problems presented by conventional torque application devices.

Figures 5A, 5B:
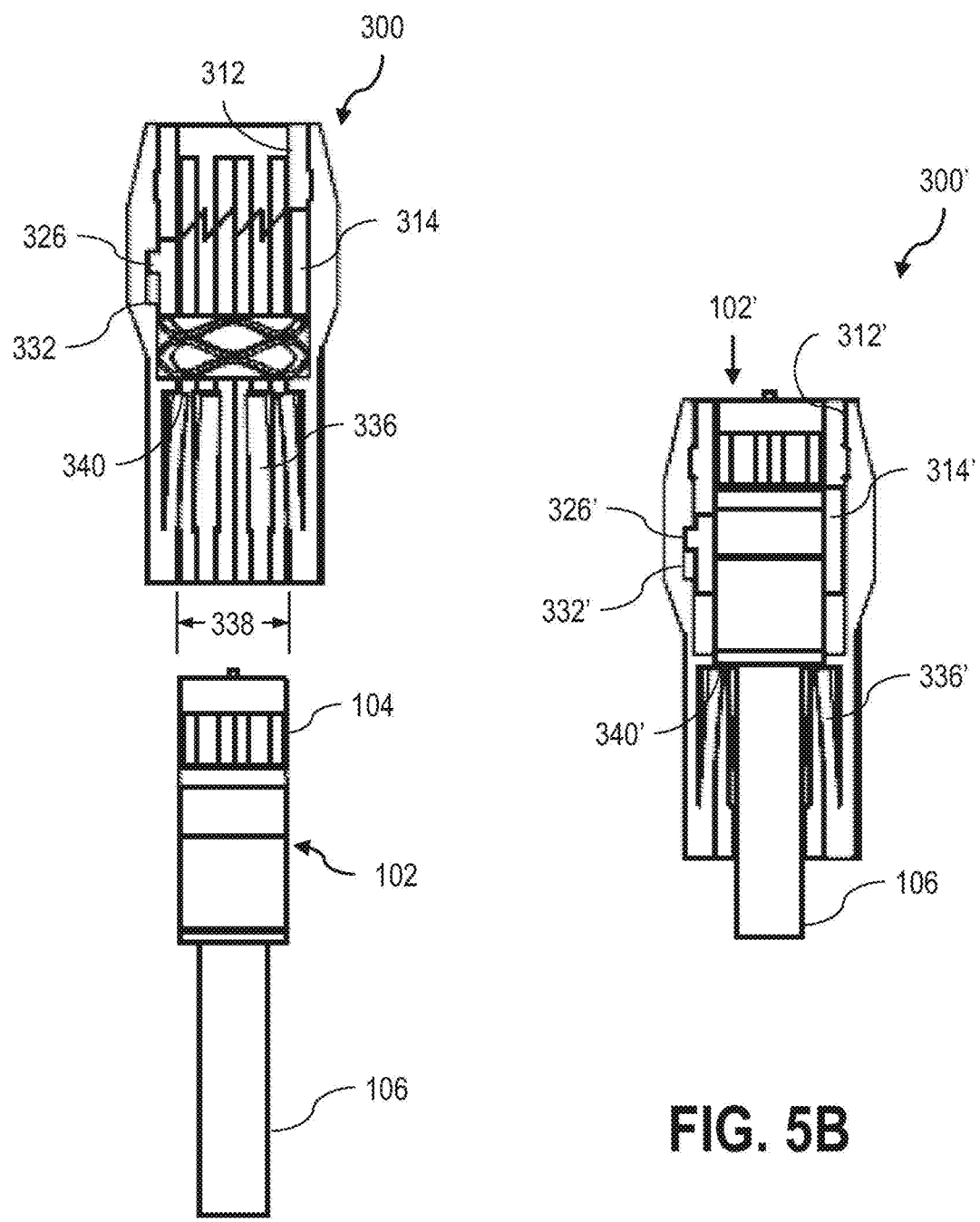
FIG. 5A is an exploded sectional view of the torque sleeve depicted in FIG. 3 and the F-connector depicted in FIG. 1A.
FIG. 5B is a sectional view of an exemplary combination of the torque sleeve and F-connector depicted in FIG. 5A.

FIG. 5A is an exploded sectional view of torque sleeve 300, FIG. 3, and F-connector 102, FIG. 1A. More particularly, the embodiment depicted in FIG. 5A is substantially similar to the embodiment depicted in FIG. 4A, except for the addition of F-connector 102 attached to cable 106. In the exemplary embodiment, rearward inner diameter 338 is sized to be slightly larger than the largest width of F-connector 102 (e.g., larger than hex nut 104) such that torque sleeve 300 may be easily slipped onto F-connector 102. In an exemplary embodiment, prong contact points 340 of internal tension prongs 336 extend inwardly such that the radial distance between two opposing prong contact points 340 will be less than the largest width of F-connector 102, such that insertion of F-connector 102 past prong contact points 340 will create a spring-like tension within internal tension prongs 336 in a direction perpendicular to the forward and rearward axial directions.

FIG. 5B is a sectional view of an exemplary combination of torque sleeve 300 and F-connector 102, FIG. 5A. More particularly, the embodiment depicted in FIG. 5B illustrates an operational configuration where F-connector 102' is fully inserted within torque sleeve 300'. In an exemplary embodiment, torque sleeve 300' and/or F-connector 102' our sized such that full insertion of F-connector 102' into torque sleeve 300' will enable the entirety of F-connector 102' to be disposed forward of prong contact points 340'. In an exemplary embodiment, insertion of the entirety of F-connector 102' past prong contact points 340' will cause prong contact points 340' to spring back toward cable 106' with an audible "click." In at least one embodiment, prong contact points 340 are configured to restrict axial movement of F-connector 102' in the forward/rearward directions, but allow an end user to easily separate torque sleeve 300' from F-connector 102' upon application of a reasonable amount of axial force pulling one of the respective components away from the other.

Figure 6:
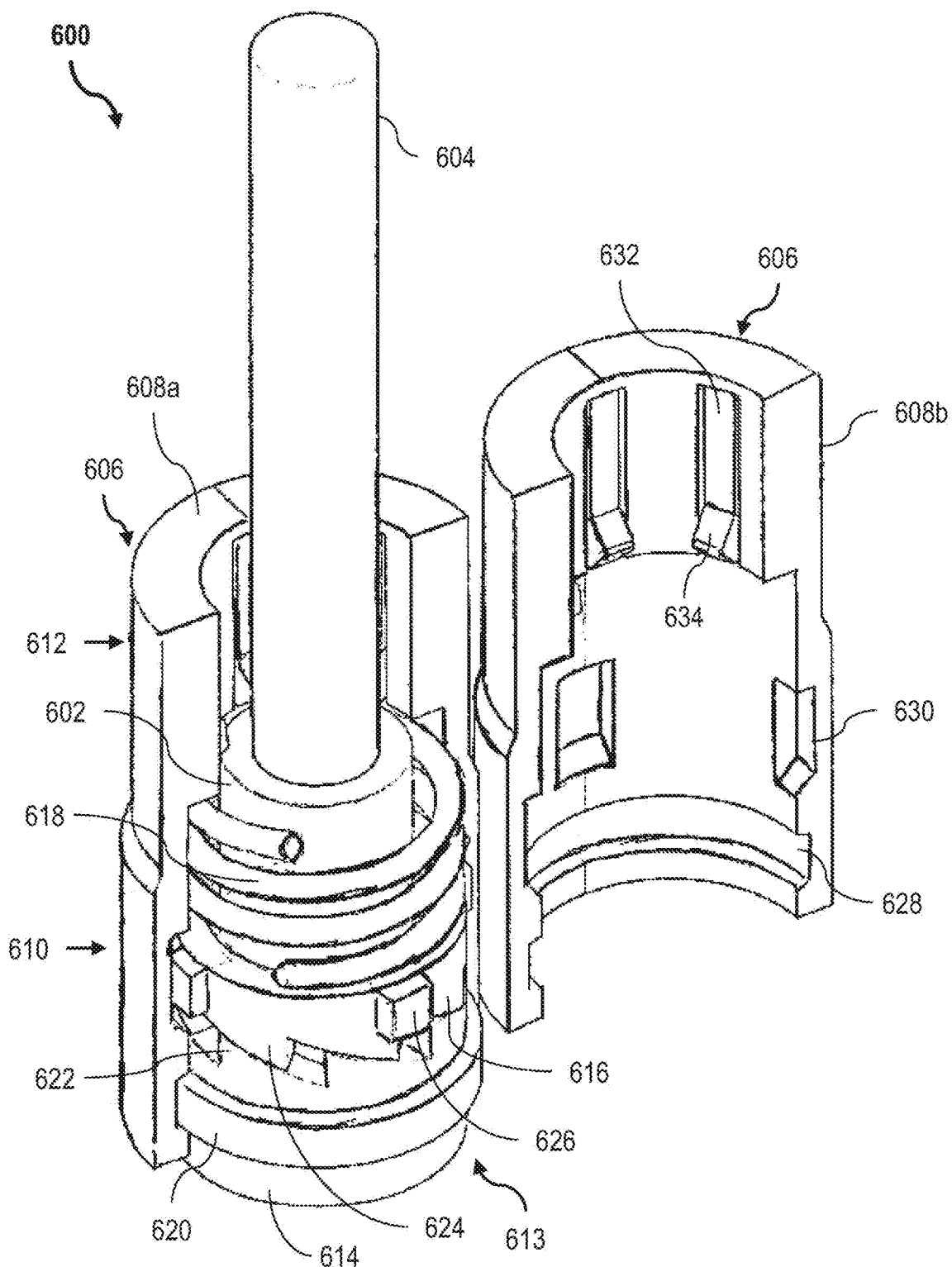
FIG. 6 is a partially disassembled perspective view of an alternative torque sleeve and an F-connector, in accordance with an embodiment.

FIG. 6 is a partially disassembled perspective view of an alternative torque sleeve 600 and an F-connector 602. Torque sleeve 600 is similar in many respects to torque sleeve 100, FIG. 1A, and torque sleeve 300, FIG. 3, and similar components thereof that are designated with the same labels may be considered to perform similar respective functionality. F-connector 602 may be considered to be substantially similar to F-connector 102, FIG. 1A.

In the embodiment depicted in FIG. 6, torque sleeve 600 is shown to be disposed with respect to F-connector 602 attached to a cable 604. Similar to the embodiments described above, torque sleeve 600 includes a generally cylindrical outer shell 608 having two substantially symmetrical shell halves 608a, 608b, a forward portion 610, and a rearward portion 612. Torque sleeve 600 further includes an internal torque subassembly 613. Internal torque subassembly 613 includes a slip ring 614, a torque ring 616, and a torque spring 618.

Slip ring 614 is generally cylindrical, and includes an outer disc portion 620 and a plurality of slip teeth 622 arranged in a substantially sawtooth pattern facing torque ring 616. In a similar manner, torque ring 616 includes a plurality of torque teeth 624 also arranged in a substantially sawtooth pattern facing slip ring 614, and configured to matingly engage with slip teeth 622 to form a substantially continuous structure when so engaged. Torque ring 616 further includes a plurality of ring protrusions 626 extending radially therefrom.

Also similar to the embodiments described above, outer shell 606 includes a shell groove 628 sized to receive outer disc portion 620 when torque sleeve 600 is fully assembled, and includes internal torque subassembly 613. Outer shell 606 further includes a plurality of shell slots 630 and a plurality of internal tension prongs 632 disposed evenly therein. Each of internal tension prongs 632 includes a respective prong contact point 340 extending inwardly toward the central axis (not shown in FIG. 6) of torque sleeve 600. Torque sleeve 600 is not illustrated to include an external gripping structure. Nevertheless, an external gripping structure may be included on outer sleeve 606 if desired.

The exemplary embodiments described herein provide an innovative torque sleeve that, when installed about an F-connector, the slip ring thereof may be configured to fit over the hex nut of the F-connector that is used to tighten the F-connector to the respective CPE. The respective opposing teeth on the slip ring and torque ring have a sawtooth configuration that enables the teeth to engage in both rotational directions with the aid of the torque spring. The torque spring enables the slip ring and torque ring to remain in close contact when "tightening" the hex nut, until a desired torque has been achieved. Once the desired torque has been achieved, the torque ring will slide back against the spring to allow the outer shell and torque ring to turn without turning the slip ring.

Moreover, the innovative sawtooth shape of the opposing ring teeth further enables the slip ring and torque ring to remain in contact, without slipping, under essentially any torque pressure, which is particularly desirable in the field, since many connectors typically require removal of some torque as time passes. The conventional torque application devices, however, are unable to accommodate this requirement. In contrast, the present devices, systems, and methods allow for relatively easy "unscrewing" of the hex nut of an F-connector at any time, and by hand. Many conventional torque application devices are single-use devices only; many such conventional devices must be physically removed (e.g., and thereby destroyed) from the respective connector before the connector may be detached from the CPE. In contrast, the torque sleeve embodiments described herein are capable of multiple uses on the same connection, or may be easily removed from one connection to be used to attach another.

Accordingly, the present embodiments advantageously allow a consumer to safely, repeatedly, and properly install/reinstall an F-connecter to the correct torque. Implementation of the present devices, systems, and methods will therefore result in a significant risk reduction of interfering signals onto a cable plant from improper torquing of a connector, and thus improving the overall performance of the equipment, while also reducing the need for a technician to respond to trouble calls that are based on loose or damaged connections. The unique design configurations of the present embodiments thereby eliminate the need for a ranch or other special tools to remove in the attached F-connector, which advantageously allows the typical consumer (who generally does not have such special tools) to easily disconnect and reconnect their own CPE equipment without damaging the equipment, the F-connector, or the cable. The elegant design of the present embodiments further represents a simplified hardware construction, in comparison with conventional devices, which may be included with the packaging of many commercial CPE devices, and without significantly increasing the cost of such devices to the consumer.

Exemplary embodiments of torque sleeves and related systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for mating a connector with a structure, the apparatus comprising:
   an outer shell of a torque sleeve, the outer shell forming an interior;
   an internal torque subassembly disposed in the ulterior of the outer shell of the torque sleeve; and
   a unidirectional tooth mechanism of the internal torque subassembly including a plurality of teeth, the unidirectional tooth mechanism configured to provide unidirectional slippage, the unidirectional slippage preventing a threshold torque from being exceeded in a first rotational direction while preventing slippage in a second rotational direction;

wherein the internal torque subassembly includes a slip ring and a torque ring, the plurality of teeth including a first plurality of teeth and a second plurality of teeth, the first plurality of teeth disposed on the slip ring and the second plurality of teeth disposed on the torque ring.

2. The apparatus of claim 1, wherein the first plurality of teeth is oriented in a first axial direction of the torque sleeve and the second plurality of teeth is oriented in a second axial direction of the torque sleeve.

3. The apparatus of claim 2, wherein the first axial direction is opposite the second axial direction.

4. The apparatus of claim 1, wherein the slip ring is biased towards the torque ring.

5. An apparatus for mating a connector with a structure, the apparatus comprising:
an outer shell of a torque sleeve, the outer shell forming an interior;
an internal torque subassembly disposed in the interior of the outer shell of the torque sleeve;
a unidirectional tooth mechanism of the internal torque subassembly including a plurality of teeth, the unidirectional tooth mechanism configured to provide unidirectional slippage, the unidirectional slippage preventing a threshold torque from being exceeded in a first rotational direction while preventing slippage in a second rotational direction; and
at least one axial movement inhibiting structure to prevent axial movement of a portion of the internal torque subassembly;
wherein the portion of the internal torque subassembly is permitted to freely rotate about a longitudinal axis within the outer shell.

6. An apparatus for mating a connector with a structure, the apparatus comprising:
an outer shell of a torque sleeve, the outer shell forming an interior;
an internal torque subassembly disposed in the interior of the outer shell of the torque sleeve;
a unidirectional tooth mechanism of the internal torque subassembly including a plurality of teeth, the unidirectional tooth mechanism configured to provide unidirectional slippage, the unidirectional slippage preventing a threshold torque from being exceeded in a first rotational direction while preventing slippage in a second rotational direction; and
at least one radial movement inhibiting structure to prevent radial movement of a portion of the internal torque subassembly about a longitudinal axis.

7. The apparatus of claim 6, wherein the portion of the internal torque subassembly is permitted to move in at least one axial direction.

8. An apparatus for mating a connector with a structure, the apparatus comprising:
an outer shell of a torque sleeve, the outer shell forming an interior;
an internal torque subassembly disposed in the interior of the outer shell of the torque sleeve; and
a unidirectional tooth mechanism of the internal torque subassembly including a plurality of teeth, the unidirectional tooth mechanism configured to provide unidirectional slippage, the unidirectional slippage preventing a threshold torque from being exceeded in a first rotational direction while preventing slippage in a second rotational direction;
wherein the connector is integrated with the torque sleeve.

9. A method for mating a connector with a structure, the method comprising:
receiving a connector in a first portion of an outer shell of a torque sleeve;
receiving a structure in a second portion of the outer shell of the torque sleeve;
connecting the connector to the structure by translating a torque on the outer shell to an internal torque subassembly, the internal torque subassembly tightening the connector to the structure in a first rotational direction; and
preventing a threshold torque from being exceeded in the first rotational direction by providing unidirectional slippage using a unidirectional tooth mechanism of the internal torque subassembly, the unidirectional tooth mechanism including a plurality of teeth;
wherein the internal torque subassembly includes a slip ring and a torque ring, the plurality of teeth including a first plurality of teeth and a second plurality of teeth, the first plurality of teeth disposed on the slip ring and the second plurality of teeth disposed on the torque ring.

10. The method of claim 9, wherein the first plurality of teeth is oriented in a first axial direction of the torque sleeve and the second plurality of teeth is oriented in a second axial direction of the torque sleeve.

11. The method of claim 10, wherein the first axial direction is opposite the second axial direction.

12. The method of claim 9, further comprising:
biasing the slip ring towards the torque ring.

13. A method for mating a connector with a structure, the method comprising:
receiving a connector in a first portion of an outer shell of a torque sleeve;
receiving a structure in a second portion of the outer shell of the torque sleeve;
connecting the connector to the structure by translating a torque on the outer shell to an internal torque subassembly, the internal torque subassembly tightening the connector to the structure in a first rotational direction;
preventing a threshold torque from being exceeded in the first rotational direction by providing unidirectional slippage using a unidirectional tooth mechanism of the internal torque subassembly the unidirectional tooth mechanism including a plurality of teeth;
preventing axial movement of a portion of the internal torque subassembly using at least one axial movement inhibiting structure; and
permitting the portion of the internal torque subassembly to freely rotate about a longitudinal axis within the outer shell.

14. A method for mating a connector with a structure, the method comprising:
receiving a connector in a first portion of an outer shell of a torque sleeve;
receiving, a structure in a second portion of the outer shell of the torque sleeve;
connecting the connector to the structure by translating a torque on the outer shell to an internal torque subassembly, the internal torque subassembly tightening the connector to the structure in a first rotational direction;
preventing a threshold torque from being exceeded in the first rotational direction by providing unidirectional slippage using a unidirectional tooth mechanism of the internal torque subassembly, the unidirectional tooth mechanism including a plurality of teeth; and preventing radial movement of a portion of the internal torque subassembly about a longitudinal axis using at least one radial movement inhibiting structure.

15. The method of claim 14, further comprising:

permitting the portion of the internal torque subassembly to move in at least one axial direction.

\* \* \* \* \*